US007010864B2

(12) United States Patent
Murakami

(10) Patent No.: US 7,010,864 B2
(45) Date of Patent: Mar. 14, 2006

(54) TERMINAL EXAMINATION JIG

(75) Inventor: Takao Murakami, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/852,417

(22) Filed: May 25, 2004

(65) Prior Publication Data

US 2004/0253866 A1 Dec. 16, 2004

(30) Foreign Application Priority Data

Jun. 12, 2003 (JP) ........................ P. 2003-167514

(51) Int. Cl.
*G01B 5/252* (2006.01)

(52) U.S. Cl. ........................................................ 33/533

(58) Field of Classification Search ................ 439/489, 439/912, 310; 324/538; 33/533, 645, 545; 140/147, 149
See application file for complete search history.

(56) References Cited

U.S. PATENT DOCUMENTS 2,971,555 A * 2/1961 Paulson ....................... 72/125
3,226,837 A * 1/1966 Wilkie et al. ................. 33/545
4,939,847 A * 7/1990 Jones .......................... 33/545
5,419,711 A * 5/1995 Noro et al. ................. 439/310
5,926,026 A * 7/1999 Furuzawa et al. .......... 324/538
6,476,616 B1 * 11/2002 Yoshida ...................... 324/438

FOREIGN PATENT DOCUMENTS

JP 9-138261 A 5/1997

* cited by examiner

*Primary Examiner*—Neil Abrams
(74) *Attorney, Agent, or Firm*—Sughrue Mion, PLLC

(57) ABSTRACT

A terminal examination jig 10 includes a jig body 12 having a gauge receiving portion 13 and a terminal holding portion 20, and a limit gauge 28 releasably supported pivotally on a support pin 14 extending through the gauge receiving portion 13 in a bridging manner. The terminal receiving portion 20 has a fixing surface 23*a* against which a bottom surface of a terminal (an object to be examined) is adapted to abut, and a fixing screw 25 for pressing the terminal against the fixing surface 23*a* to hold the terminal is provided at the terminal receiving portion 20. The limit gauge 28 has an opening portion 30 which is formed into a shape corresponding to the shape of an electrical contact portion of the terminal. Whether or not the bending of the terminal is within a tolerance is judged by checking whether or not the electrical contact portion can pass through the opening portion 30 without interference when the limit gauge 28 is pivotally moved about the support pin 14.

8 Claims, 6 Drawing Sheets

TERMINAL EXAMINATION JIG

BACKGROUND OF THE INVENTION

1. Field of the Invention

This invention relates to a terminal examination jig for checking whether or not the bending of a terminal to be received, for example, in a connector of an automotive wire harness, is within a predetermined tolerance.

2. Related Art

A crimp-type terminal includes at least one pair of press-clamping piece portions, and can be connected to a wire by inwardly press-fastening the pair of press-clamping piece portions to the wire. This crimp-type terminal has a problem that its electrical contact portion, provided at its distal end, is bent when the press-clamping piece portions are press-fastened to the wire. A bend-up (upward bending), a bend-down (downward bending) and a twist (lateral bending) are known as deformations of the crimp-type terminal.

The deformation of the crimp-type terminal has heretofore been examined by a comparison observation method (in which the examination operator compares an actual product with an on-specification product (whose dimensional variation is within a tolerance) with the eyes) or by the use of a simplified microscope. However, such method has problems that an error due to an individual difference occurs and that much time is required for the examination, so that the efficiency of the examination operation is not good.

Therefore, there is known a terminal examination jig 50 (shown in FIG. 9) which has been proposed in order to solve the above problems as shown in Japanese Unexamined Patent Publication Hei. 9-138261. This conventional example provides the terminal examination jig 50 capable of precisely examining a bent male terminal 54, and this jig includes a pin receiving portion 55 having a hole 57 of a minimum size into which an electrical contact portion 54*a* of the male terminal 54 can be inserted to reach the vicinity of a conducting pin 57*a*. If the male terminal 54 is bent even slightly, the electrical contact portion 54*a* can not be inserted into the pin receiving portion 55, and therefore can not be brought into contact with the conducting pin 7*a*. In this manner, the bending of the male terminal 54 can be judged.

This terminal examination jig 50 comprises a body 51, a fixed connector holding portion 52 provided upright at one end of the body 51, and the movable pin receiving portion (corresponding to a mating connector) 55 which contains the conducting pin 57*a* for contact with the male terminal 54 of a connector 53 held by the connector holding portion 52, and this pin receiving portion 55 can be slidingly moved to fit on the connector 53 by pivotally moving a lever 60. The insertion hole 57 for the insertion of the electrical contact portion 54*a* of the male terminal 54 thereinto is formed in the pin receiving portion 55, and the conducting pin 57*a* is provided in a projecting manner within the insertion hole 57.

The connector 53 comprises a connector housing 53*a* having a terminal receiving chamber, and the male terminal 54 received in the terminal receiving chamber. The connector 53 is held by the connector holding portion 52 in such a manner that the electrical contact portion 54*a* of the male terminal 54 is opposed to the conducting pin 57*a* in the pin receiving portion 55.

The movable pin receiving portion 55, while guided by a straight guide key 61 formed at the body 51, can slide toward and away from the connector 53. A recess portion 56 for fitting on a fitting portion 53*b* of the connector 53 is formed at the pin receiving portion 55, and the insertion hole 57 (within which the conducting pin 57*a* is provided in a projecting manner) is formed in the recess portion 56. The insertion hole 57 is formed into a size substantially equal to an allowable amount of bending of male terminal 54, and the male terminal 54, deformed beyond the allowable limit, can not be inserted into the insertion hole 57.

The pin receiving portion 55 is normally urged in a direction away from the connector 53 by a spring force of a coil spring 63 mounted around a guide shaft 62, and is located at a left position (in the drawing) when the lever 60 is not operated for pivotal movement. When the lever 60 is operated to be pivotally moved, the pin receiving portion 55 is moved toward the connector 53 against the spring force of the coil spring 63, and is fitted on the connector 53.

The lever 60 is provided at a rear end of the pin receiving portion 55, and can slide the pin receiving portion 55 through its cam surface 60*a*, and this lever 60 is pivotally supported by a pin 64. When the lever 60 is not operated, the pivotal movement of this lever is stopped by a stopper 65.

However, this terminal examination jig has the following problems.

Firstly, the number of the component parts of the terminal examination jig 50 is large, and therefore there is encountered a problem that the jig has a large size, and therefore has a poor handleability. In addition, it is difficult to enhance the precision of examination of the jig itself, and the compact and precise connector, as well as the male terminal to be received in this connector, can not examined highly precisely.

And besides, in this terminal examination jig 50, the connector 53, receiving the male terminal 54 therein, must be fixed to the connector holding portion 52, and time and labor are required for fixing the connector 53, and the examination can not be carried out efficiently (It is difficult to enhance the efficiency of the examination operation).

Furthermore, the object to be examined is limited to the connector 53 (the male terminal 54), and when the kind of connector 53 is changed, a modified connector holding portion 52 and a modified pin receiving portion 55 must be additionally produced, and therefore there has been encountered a problem that the above examination jig can not used on a general-purpose basis for the examination of other kinds of connectors and terminals. And besides, the connector 53 is limited to a female-type connector including the so-called female connector housing 53*a* having the male terminal 54 received therein, and the examination of male-type connectors and female terminals can not be carried out.

Furthermore, there is a fear that when the lever 60 is vigorously pivotally moved so as to fit the pin receiving portion 55 on the connector 53, the conducting pin 57*a* strikes hard against the male terminal 54, so that the male terminal 54 and the conducting pin 57*a* are damaged.

SUMMARY OF THE INVENTION

In view of the foregoing, it is an object of this invention to provide a terminal examination jig of a high general-purpose ability which is capable of easily examining either of a bent male terminal and a bent female terminal, and can enhance the efficiency of the examination operation, and can be produced at a low cost, using a small number of component parts, and can examine many kinds of terminals.

In a first aspect of the present invention, the above object has been achieved by a terminal examination jig of the present invention is provided in that the jig comprises a jig body including a gauge receiving portion and a terminal holding portion, and a limit gauge received in the gauge receiving portion, and bending of a terminal, fixed to the terminal holding portion, is examined by the use of the limit gauge; and the limit gauge has an opening portion corresponding in shape to an electrical contact portion of the terminal, and whether or not the bending of the terminal is within a predetermined tolerance is judged by checking whether or not the electrical contact portion of the terminal, projecting toward the limit gauge, can pass through the opening portion without interference.

In the above construction, when the bending of the terminal, fixed to the terminal holding portion, is within the tolerance, the electrical contact portion of the terminal passes through the opening portion of the limit gauge, and therefore it is judged that the terminal is an accepted product (on-specification product). On the other hand, when the angle of bending of the terminal is larger than the tolerance, the electrical contact portion of the terminal fails to pass through the opening portion of the limit gauge, and therefore it is judged that the terminal is an unacceptable product (defective product). And besides, the number of the component parts is reduced.

In a second aspect of the present invention, the terminal examination jig of the present invention, depending from the first aspect of the present invention, is provided in that the terminal holding portion has a fixing surface against which a base surface of the terminal is adapted to abut, and a fixing member for pressing the terminal against the fixing surface to fix the terminal is provided at the terminal holding portion.

In this construction, the base surface of the terminal is held against the fixing surface of the terminal holding portion by the fixing member such as a screw or a spring, so that a reference position of the terminal relative to the opening portion of the limit gauge is determined.

In a third aspect of the present invention, the terminal examination jig of the present invention, depending from the first or second aspect of the present invention, is provided in that a guide surface for an outer surface of the limit gauge is formed at the gauge receiving portion.

In this construction, the limit gauge is guided by the guide surface, so that the reference position of the limit gauge relative to the electrical contact portion of the terminal is determined.

In a fourth aspect of the present invention, the terminal examination jig of the present invention, depending from any one of the first to third aspect of the present invention, is provided in that the limit gauge is pivotally supported on the jig body.

In this construction, by pivotally moving the limit gauge through an arbitrary angle, it can be easily judged whether or not the electrical contact portion of the terminal can pass through the opening portion of the limit gauge.

In a fifth aspect of the present invention, the terminal examination jig of the present invention, depending from the fourth aspect, is provided in that a support pin is mounted on the gauge receiving portion, and the limit gauge is pivotally supported by the support pin.

In this construction, the limit gauge can be pivotally moved in a stable manner thanks to the provision of the support pin.

In a sixth aspect of the present invention, depending from the first to fifth aspect, is provided in that a width of the opening portion is substantially equal to an allowable amount of bending of the terminal.

In this construction, when the bending of the terminal is within the allowable range, the electrical contact portion of the terminal passes through the opening portion of the limit gauge, and therefore it is judged that the terminal is an accepted product. Therefore, any terminal whose bending is beyond the allowable limit will not be delivered to a subsequent process step, and the limit gauge serves its purpose.

DETAILED DESCRIPTION OF THE PREFERRED EMBODIMENTS

A preferred embodiment of the present invention will now be described in detail with reference to the drawings.

One preferred embodiment of a terminal examination jig 10 of the invention, shown in FIGS. 1 to 6, is a jig incorporating a limit gauge 28. This jig is capable of precisely examining a bent male terminal 35, can be easily handled, can carry out an examination easily, can enhance the efficiency of the examination operation, and has a small number of component parts, so that the jig is compact and excellent in portability. The limit gauge 28 is a gauge for judging whether or not the angle θ of bending of the male terminal 35 is within a limit angle (within a tolerance). Here, the term "bending angle θ" means an angle between a bottom surface (horizontal surface) 37*c* (serving as a reference surface) of the terminal 35 and a bottom surface 36*a* of an electrical contact portion 36 of the bent terminal 35 (FIG. 8), and the limit angle means the maximum bending angle allowed for a product specification.

Figure 5:
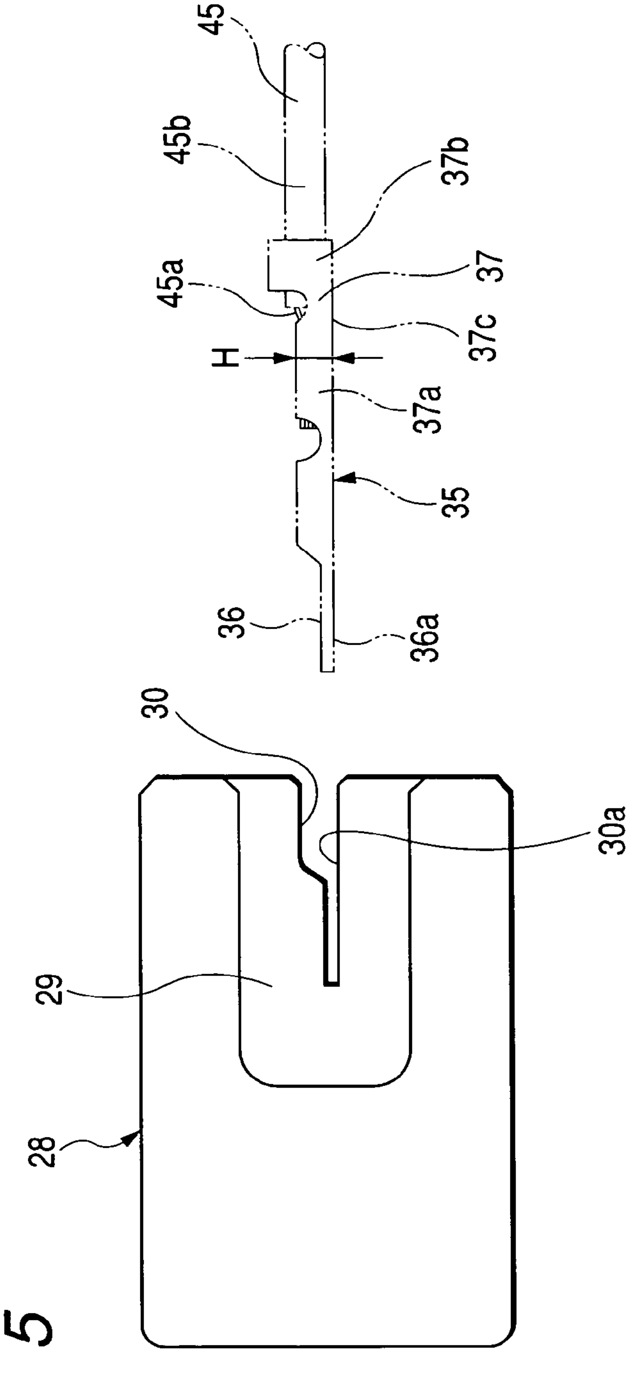
FIG. 5 is a plan view showing the male terminal and the examination jig.
Figure 6:
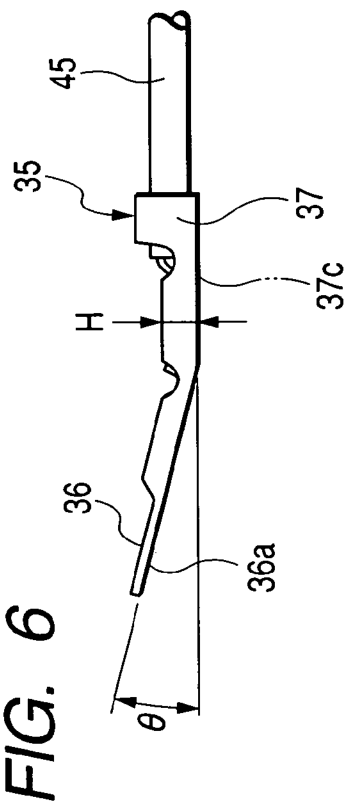
FIG. 6 is a plan view showing one example of bent male terminal.
Figure 7:
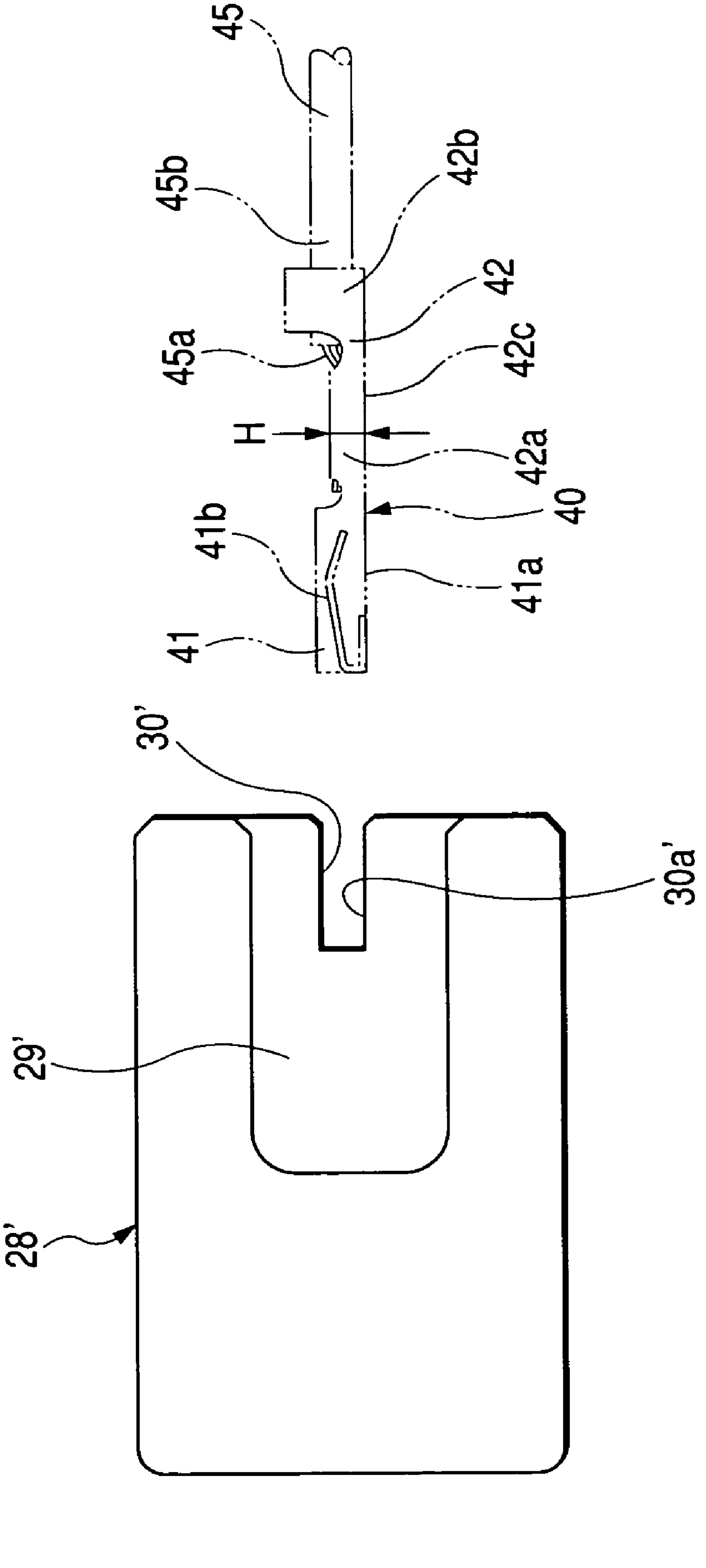
FIG. 7 is a plan view showing a modified examination jig of the invention and a female terminal.

The terminal 35 which is an object to be examined is a male terminal or a female terminal which is received, for example, in a connector (not shown) of an automotive wire harness. FIG. 5 shows the male terminal 35 which is to be measured by this terminal examination jig 10. FIG. 7 shows a female terminal 40 and a limit gauge 28' used for the examination of this female terminal 40.

The terminal examination jig 10 of this embodiment comprises a jig body 12 having a gauge receiving portion 13 and a terminal holding portion 20, and the limit gauge 28 releasably supported pivotally on a support pin 14 extending transversely (in a right-left direction) through the gauge receiving portion 13 in a bridging manner. The terminal receiving portion 20 has a fixing surface 23*a* against which the bottom surface (base surface) 37*c* of the male terminal 35 (the object to be examined) is adapted to abut, and a fixing screw (fixing member) 25 for pressing the male terminal 35 against the fixing surface 23*a* to hold the male terminal 35 is provided at the terminal receiving portion 20. The limit gauge 28 has an opening portion 30 which is formed into a shape corresponding to the shape of the electrical contact portion 36 of the male terminal 35. The male terminal 35 is held by the terminal holding portion 20, with the electrical contact portion 36 projecting toward the limit gauge 28, and in this condition the limit gauge 28 is pivotally moved about the support pin 14, and whether or not the bending angle θ of the male terminal 35 is within the limit angle is judged by checking whether or not the electrical contact portion 36 can pass through the opening portion 30 without interference. This is a feature of the invention.

A reference surface (guide surface) 13*d* for guiding the pivotal movement of the limit gauge 28 is formed on the gauge receiving portion 13, and extends in a direction perpendicular to the axis of the support pin 14, and thanks to the provision of this reference surface 13*d*, the positioning of the opening portion 30 of the limit gauge 28 relative to the electrical contact portion 36 of the male terminal 35 can be effected. This is another feature of the invention.

In this construction, when the bending angle θ of the male terminal 35 is within the allowable limit angle, the electrical contact portion 36 of the male terminal 35 passes through the opening portion 30 of the limit gauge 28, and therefore it is judged that the male terminal 35 is an acceptable product. On the other hand, when the bending angle θ of the male terminal 35 is larger than the limit angle, the electrical contact portion 36 of the male terminal 35 fails to pass through the opening portion 30 of the limit gauge 28, and therefore it is judged that the male terminal 35 is an unacceptable product. The positioning of the limit gauge 28 is effected by holding it against the reference surface 13*d*, and the positioning of the male terminal 35 is effected by holding it against the fixing surface 23*a* of the terminal holding portion 20, and the positioning of the limit gauge 28 and the terminal 35 relative to each other is effected accurately.

The construction and operation of the terminal examination jig 10 of this embodiment will be described below in detail.

Figure 2:
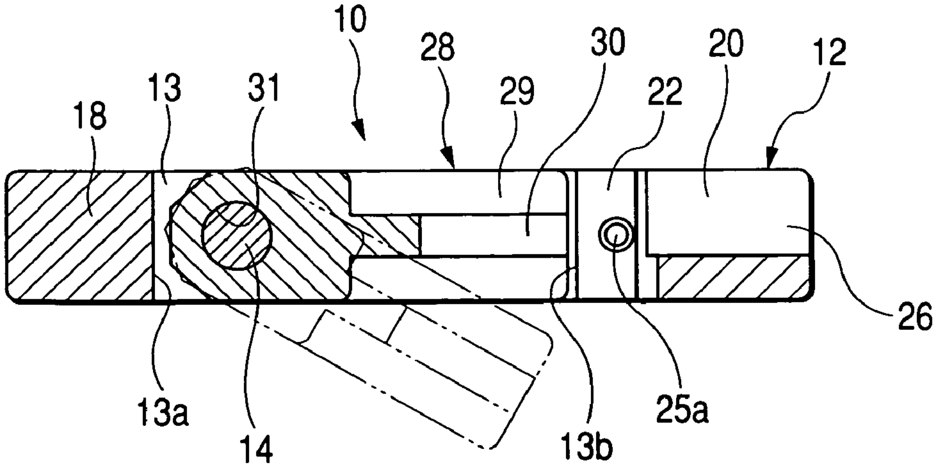
FIG. 2 is a cross-sectional view taken along the line A—A of the terminal examination jig of FIG. 1.
Figure 3:
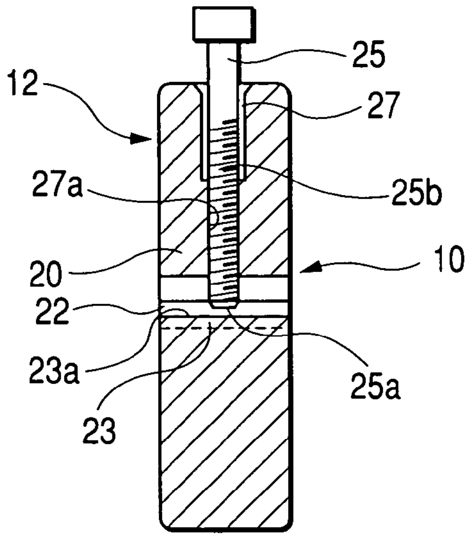
FIG. 3 is a cross-sectional view taken along the line B—B of the terminal examination jig.

For the purpose of describing the invention, concepts "forward-rearward direction", "left-right direction (direction of the width)" and "upward-downward direction (direction of the height)" will be defined as follows. The forward-rearward direction is defined as the longitudinal direction of the jig body 12, and the front side is defined as that portion where the support pin 14 is provided, and the rear side is defined as that portion where the fixing screw 25 is provided, and the left-right direction is defined as the axial direction of the support pin 14, and the left side is defined as that portion where the fixing screw 25 is provided. The upward-downward direction is defined as the direction of a plate thickness of the jig body 12, and the lower side is defined as that side toward which the limit gauge 28 is pivotally moved (FIG. 2).

Figure 1:
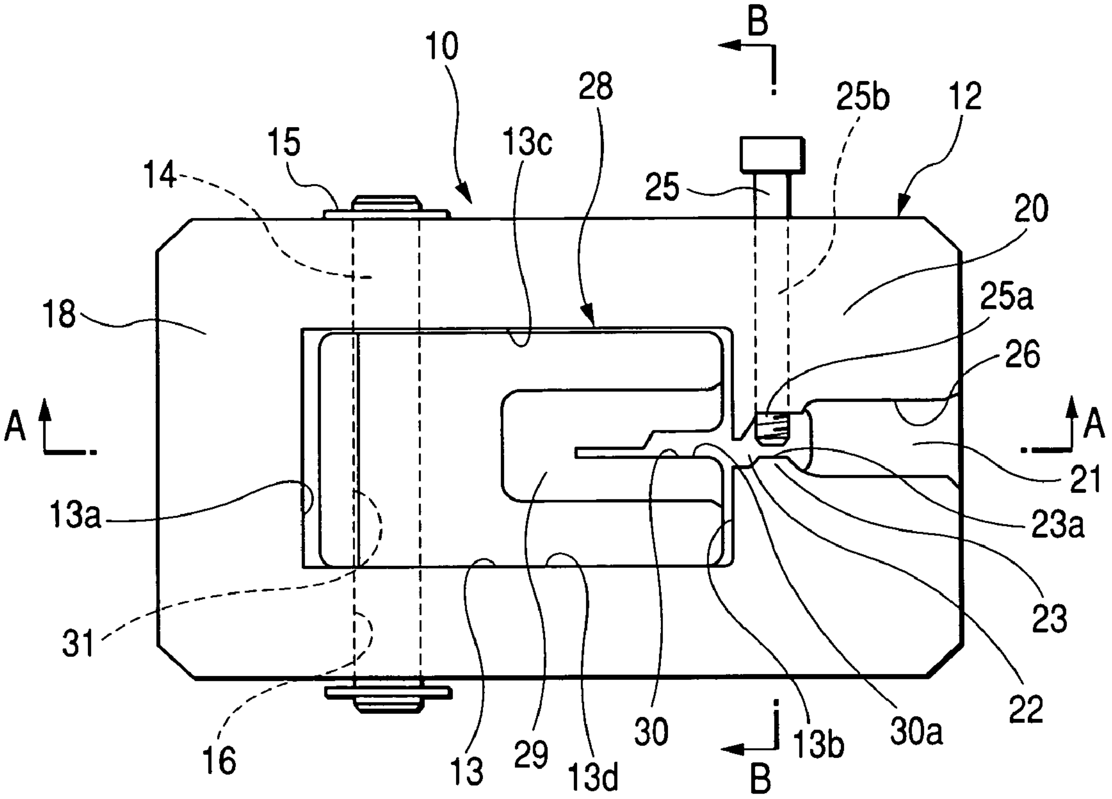
FIG. 1 is a plan view of one preferred embodiment of a terminal examination jig of the present invention.

As shown in FIG. 1, the terminal examination jig 10 comprises the jig body 12, and the limit gauge 28. The jig body 12 is made of structural alloy steel such as chromium-molybdenum steel (SCM), and has a rectangular plate-like shape. The gauge receiving portion 13 is in the form of a rectangular hole, and is formed through a central portion of the jig body 12. A grip portion 18 for being gripped by the fingers of the examination operator is formed at the front end of the jig body 12, and the terminal holding portion 20 for holding the male terminal 35 (the object to be examined) is formed at the rear end of the jig body 12.

The support pin 14 is provided at the front end portion of the gauge receiving portion 13, and extends from the left side to the right side in a bridging manner. The support pin 14 is a metal pin formed separately from the jig body 12, and is straight, and has a round cross-section. This support pin 14 is supported at its opposite end portions by pin receiving portions 16 formed respectively in opposite side portions of the jig body 12. The support pin 14 has such a diameter that it will not be flexed and deformed even when the limit gauge 28, mounted on a central portion of this support pin 14, is pivotally moved. A fit tolerance at each end portion of the support pin 14 (which is supported at its opposite end portions) is so determined that the support pin 14 will not shake.

The opposite ends of the support pin 14 project slightly from the opposite side surfaces of the jig body 12, respectively, and retainer rings 15 are fitted respectively on these projecting end portions. The retainer rings 15 prevent the axial movement of the support pin 14, thus preventing this support pin 14 from withdrawal from the jig body 12. The retainer rings 15 are fitted directly on the support pin 14, and have a generally C-shape, and are made of spring steel (SUP) or the like, and therefore these retainer rings 15 can be easily fitted on the support pin 14.

The gauge receiving portion 13 is slightly larger in size than the limit gauge 28. When the limit gauge 28 is mounted in this gauge receiving portion, a gap is formed between a front inner surface 13*a* and the limit gauge 28, and a gap is formed between a rear inner surface 13*b* of the gauge receiving portion 13 and the limit gauge 28, and a gap is formed between a left inner side surface 13*c* and the limit gauge 28. The right inner side surface of the gauge receiving portion 13 serves as the reference surface 13*d*, and the limit gauge 28 can be pivotally moved while held in sliding contact with the reference surface 13*d*. Thus, the gaps are formed at the three sides of the gauge receiving portion 13, respectively, and therefore the limit gauge 28 can be easily operated to be pivotally moved about the support pin 14. The reference surface 13*d* does not always need to be formed over an entire area of the right inner side surface of the gauge receiving portion 13, but may be formed at least on part of the right inner side surface. The reference surface 13*d* can be changed, depending on the direction of the limit gauge 28 and the direction of the terminal.

The inner surfaces 13*a* to 13*d* of the gauge receiving portion 13 are finished by polishing or the like into center line average roughness (Ra) (surface roughness) of not smaller than 1.6 a. Particularly, the reference surface 13*d* for contact with the outer surface of the limit gauge 28 to guide the same is more precisely finished than the other inner surfaces 13*a* to 13*c* so that the positioning of the limit gauge 28 can be effected highly precisely.

The terminal holding portion 20 includes a slot 21 for receiving a wire connection portion 37 of the male terminal 35 and a wire 45 connected to the male terminal 35, and the fixing screw 25 for fixing the male terminal 35 within the slot 21. The slot 21 is formed into a stepped configuration, and includes a narrow portion 22 communicating with the gauge receiving portion 13, and a wide portion 26 extending from the narrow portion 22. A projection 23 is formed at the narrow portion 22, and a distal end 25*a* of the fixing screw 25 is disposed in opposed relation to this projection 23.

The upper surface of the projection 23 is flat, and defines the fixing surface 23*a* against which the bottom surface (reference surface) 37*c* of the male terminal 35 is adapted to abut. This fixing surface 23*a* and one inner side surface 30*a* of the opening portion 30 are disposed in a common plane. The male terminal 35 is pressed against the fixing surface 35*a* by the fixing screw 25, and therefore is fixed thereto, and by doing so, the reference position of the male terminal 35 is determined, and the positioning of the limit gauge 28 and the electrical contact portion 36 of the male terminal 35 relative to each other can be effected accurately.

The fixing screw 25 is passed through a passage hole 27 formed in a wall portion of the jig body 12. An externally-threaded portion 25*b* of the fixing screw is threaded into an internally-threaded portion 27*a* formed in an inner portion of the passage hole 27, and the distal end 25*a* is exposed to the narrow portion 22 of the slot 21. By tightening the fixing screw 25, the male terminal 35 is fixedly held between the fixing surface 23*a* of the projection 23 and the distal end 25*a* of the fixing screw 25. The distance between the fixing surface 23*a* and the distal end 25*a* of the fixing screw 25 corresponds to a crimp height H (FIG. 6) of the wire connection portion 37 of the male terminal 35. By adjusting the amount of tightening of the fixing screw 25, any other suitable male terminal, having a different crimp height H, can be fixed. The fixing member for fixing the male terminal 35 is not limited to the fixing screw 25, and any other suitable member, such as a hexagon socket head bolt and a spring, can be used.

The wide portion 26 is formed into such a size that the wire connection portion 37 of the male terminal 35 and the wire 45 (which is press-fastened to this wire connection portion 37, and is extended outwardly therefrom), can be received in the wide portion 26 without interference. The wide portion 26 is thus formed into a sufficiently-large width, and by doing so, any other suitable terminal of a different size, as well as any other suitable wire of a different size, can be received in the wide portion 26 without interference, so that this examination method can be applied to a wide variety of terminals and wires.

The limit gauge 28 is suitably made of high-carbon chromium steel (SCr) subjected to a heat treatment and a stabilizing treatment. By applying the heat treatment and the stabilizing treatment, an aged change in the dimensions is prevented, and also the hardness of the gauge surface increases, so that the precision of the limit gauge 28 can be maintained over a long period of time. Various surface treatments are effective in increasing the hardness of the gauge surface. For example, shot peening or ceramics-coating by physical vapor deposition (PVD method) can be applied.

The limit gauge 28 is formed into a rectangular plate-like shape, and its plate thickness is equal to the plate thickness of the jig body 12. A passage hole 31 for the passage of the support pin 14 therethrough is formed through one end portion of the limit gauge 28, while the opening portion 30 for the electrical contact portion 36 of the male terminal 35 is formed in the other end portion thereof. The support pin 14 is loosely fitted in the passage hole 31, and the limit gauge 28 can be pivotally moved about the support pin 14.

Figure 4:
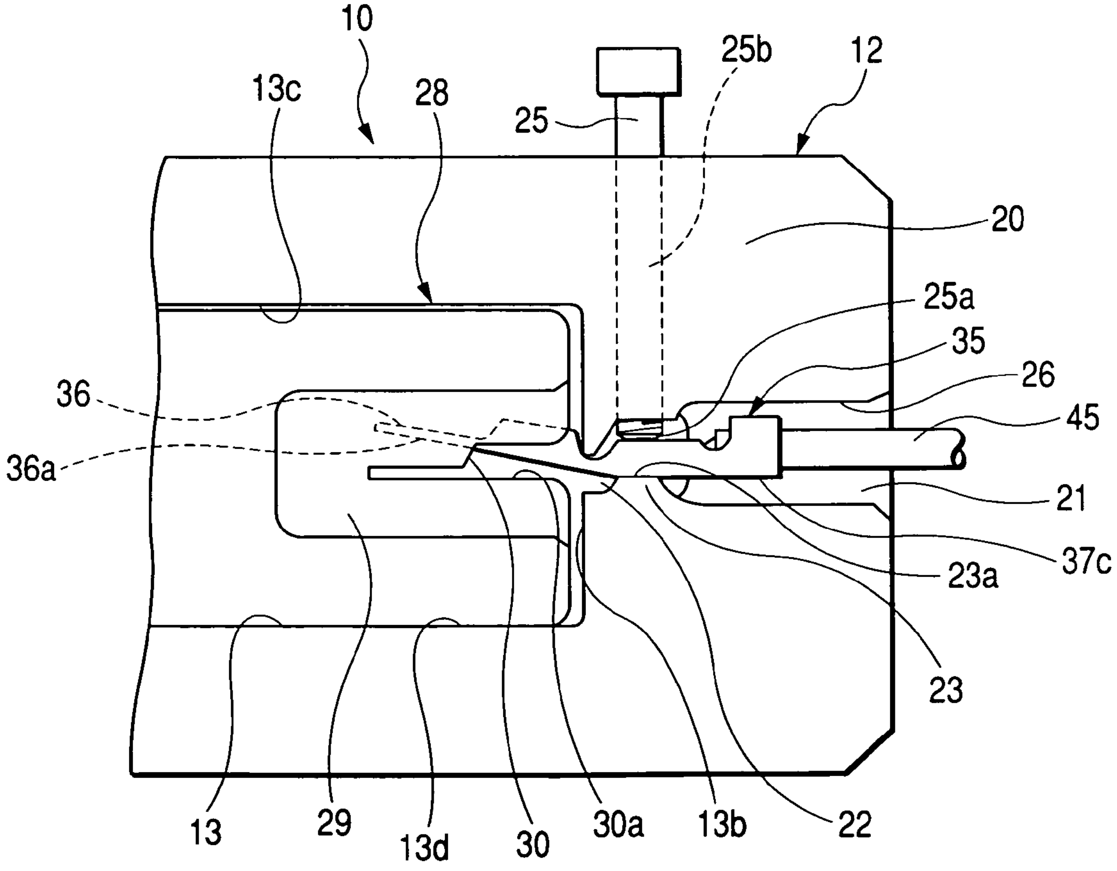
FIG. 4 is a view explanatory of the examination of a male terminal by the use of the terminal examination jig.

The opening portion 30 is precisely formed into the shape, corresponding to the shape of the electrical contact portion 36 of the male terminal 35, by electric discharge machining such as wire cutting. The width of the opening portion 30 is substantially equal to the allowable amount of bending of the male terminal 35. Within the range of the allowable value, the limit angle (the maximum angle of bending) of the male terminal 35 is determined, and the male terminal 35 whose bending angle is within the limit angle passes through the opening portion 30, and therefore is judged to be acceptable. In contrast, the terminal whose bending angle is larger than the limit angle can not pass through the opening portion 30 as shown in FIG. 4, and therefore is judged to be unacceptable.

In FIG. 5, the male terminal 35 and the limit gauge 28 are opposed to each other, and in FIG. 7, the female terminal 40 and the limit gauge 28' are opposed to each other. As shown in FIG. 5, the male terminal 35 is formed by blanking a piece from an electrically-conductive metal sheet and then by bending it, and the male terminal 35 includes the electrical contact portion 36 provided at its one end, and the wire connection portion 37 provided at the other end. The tab-like electrical contact portion 36 is formed into such a shape as to be inserted into an electrical contact portion 41 of the female terminal 40 of FIG. 7. The wire connection portion 37 includes a pair of front press-clamping piece portions 37*a* and a pair of rear press-clamping piece portions 37*b*, and the front press-clamping piece portions 37*a* are press-fastened to a conductor 45*a* of the wire 45, while the rear press-clamping piece portions 37*b* are press-fastened to a sheath 45*b* of the wire 45. Although the bottom surface 37*c* of the wire connection portion 37 serves as the reference surface of the male terminal 35, the upper surface of the wire connection portion 37 can be used as a reference surface, in which case the male terminal 35 is inverted, and is fixed in this condition.

Like the male terminal 35, the female terminal 40, shown in FIG. 7, is formed by blanking a piece from an electrically-conductive metal sheet and then by bending it. The female terminal 40 includes the box-like electrical contact portion 41 provided at one end thereof, and a wire connection portion 42 provided at the other end. A resilient contact piece portion 41*b* is formed within the electrical contact portion 41 so as to positively contact the female terminal 40 with the male terminal 35. Like the wire connection portion 37 of the male terminal 35, the wire connection portion 42 includes a pair of front press-clamping piece portions 42*a* for being press-fastened to a conductor 45, and a pair of rear press-clamping piece portions 42*b* for being press-fastened to a sheath 45*b*.

An opening portion 30' of the limit gauge 28' is formed into a shape corresponding to the shape of the electrical contact portion 41 of the female terminal 40. The opening portion 30' is formed into a size substantially equal to the allowable amount of bending of the female terminal 40 so that the female terminal 40 whose bending angle θ is within the limit angle can pass through the opening portion 30'.

The male terminal 35 is received in a female connector housing to form a female connector (not shown), while the female terminal 40 is received in a male connector housing to form a male connector (not show). When the two connectors are fitted together, the terminals 35 and 40 are electrically connected together. However, when the male terminal 35 and/or the female terminal 40 are bent at their electrical contact portions 36 and 41, there is encountered a problem that the terminals 35 and 40 are not electrically connected together when the two connectors are fitted together, thus inviting the defective connection. Therefore, the Applicant of the present application has provided the jig capable of examining the bending of the terminal 35, 40 in order to prevent such defective connection. With the use of the terminal examination jig 10 of the invention, the bent terminal 35, 40 can be precisely examined, and the jig can be easily handled, and the examination can be carried out easily, and the efficiency of the examination operation can be enhanced.

Next, the method of assembling the terminal examination jig 10, as well as the method of examining the terminal 35, 40 by the use of the terminal examination jig 10, will be described.

First, the limit gauge 28, 28' is received in the gauge receiving portion 13 of the jig body 12, and the passage hole 31, 31' in the limit gauge 28, 28' is aligned with the pin receiving portions (holes) 16 in the jig body 12, and the support pin 14 is inserted into these aligned holes. The retainer rings 15 are fitted respectively on the opposite end portions of the support pin 14 to retain the support pin 14 against withdrawal from the pin receiving portions 16. As a result, the limit gauge 28, 28' is mounted on the jig body, and can be pivotally moved about the support pin 14 while guided by the reference surface 13*d* of the gauge receiving portion 13.

Next, the terminal examination method will be described.

The limit gauge 28, 28' is pivotally moved downward (Instead, the limit gauge 28, 28' can be pivotally moved upward), and in this condition the wire connection portion 37, 42 of the terminal 35, 45, connected to the wire, is inserted into the terminal receiving portion 20 of the jig body 12, and the fixing screw 25 is tightened with a predetermined tightening torque, with the bottom surface 37*c*, 42*c* of the terminal 35, 40 held against the fixing surface 23*a*, so that the terminal 35, 40 is held in a cantilever manner. By thus pressing the terminal 35, 40 against the fixing surface 23*a*, the reference position of the terminal 34 and 40 is determined, and the positioning of the electrical contact portion 36, 41 of the terminal 35, 40 (disposed at the free end side) relative to the opening portion 30, 30' of the limit gauge 28, 28' is effected. Then, the limit gauge 28, 28' is returned to its initial position. At this time, if the electrical contact portion 36, 41 passes through the opening portion 30, 30' without interference with the limit gauge 28, 28', it is judged that the bending angle θ of the terminal 35, 40 is within the limit angle. In contrast, if the electrical contact portion 36, 41 interferes with the limit gauge 28, 28', and fails to pass through the opening portion 30, 30', it is judged that the bending angle θ of the terminal 35, 40 is larger than the limit angle.

With this construction, whether or not the bending of the terminal 35, 40 to be received in the connector is within the predetermined tolerance can be easily and accurately examined, and the efficiency of the examination operation is enhanced, and besides this construction contributes to the enhanced reliability of the connector connection. There can be provided the terminal examination jig which has the small number of the component parts, and is compact and is excellent in portability.

Figure 8:
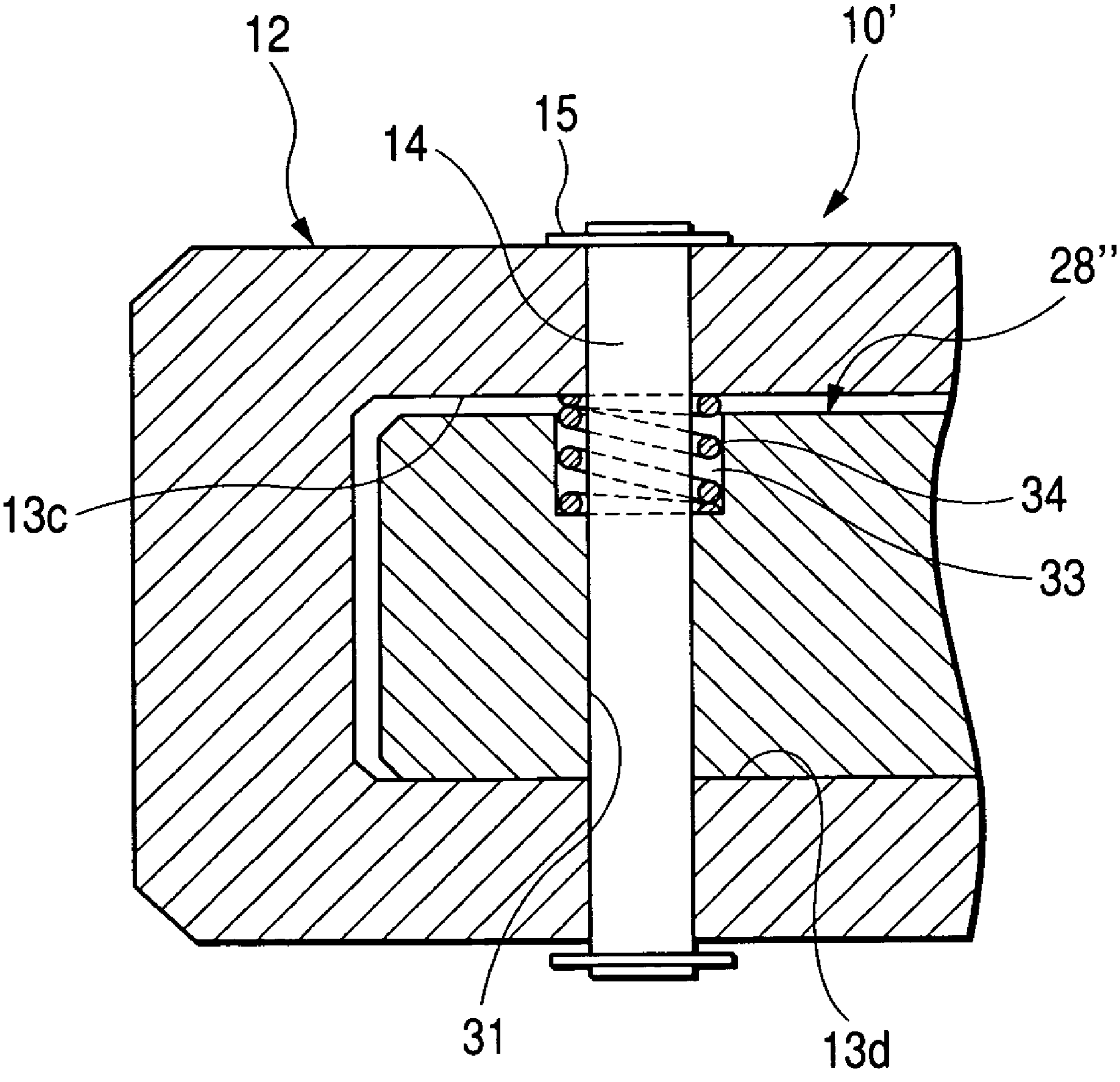
FIG. 8 is a cross-sectional view showing another modified examination jig of the invention.
Figure 9:
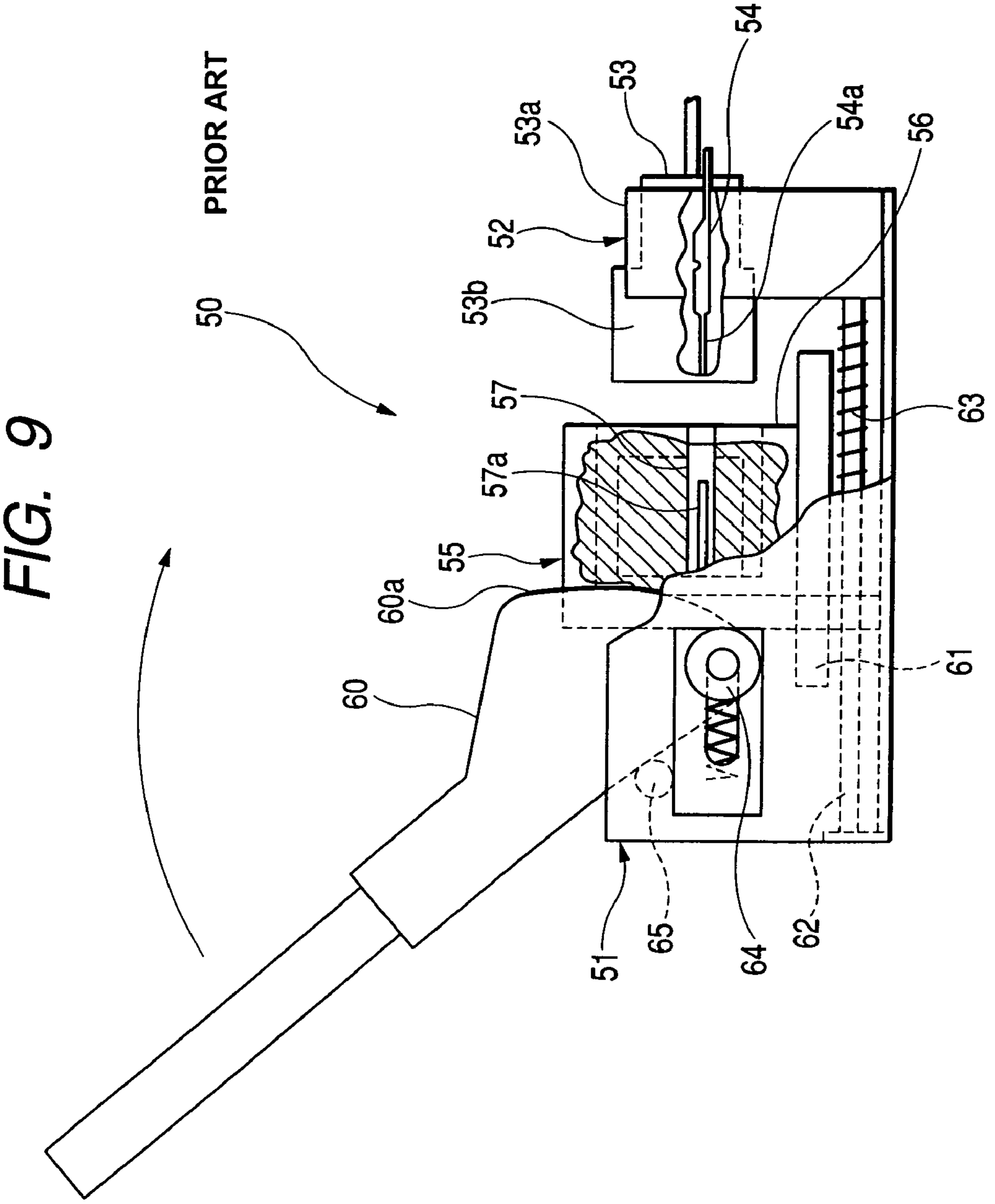
FIG. 9 PRIOR ART
FIG. 9 is a partly cross-sectional view of one conventional terminal examination jig.

As shown in FIG. 8, it is advantageous to provide a spring member between the left inner side surface 13*c* and a limit gauge 28" to normally urge the limit gauge 28" against the right inner side surface. For example, a spring receiving portion 33 is formed in a passage hole 31 (for the passage of the support pin 14 therethrough) in the limit gauge 28", and a compression coil spring 34 in a resiliently-deformed condition is received in this spring receiving portion 33 to normally urge the limit gauge 28" against the right inner side surface.

The present invention is not limited to the above embodiments, and various modifications can be made without departing from the scope of the subject matter of the invention.

As described above, in the present invention, the limit gauge has the opening portion corresponding in shape to the electrical contact portion of the terminal, and therefore when the bending of the terminal is within the tolerance, the electrical contact portion of the terminal passes through the opening portion of the limit gauge, and therefore it is judged that the terminal is an accepted product. On the other hand, when the angle of bending of the terminal is larger than the tolerance, the electrical contact portion of the terminal fails to pass through the opening portion of the limit gauge, and therefore it is judged that the terminal is an unacceptable product. Therefore, the bent male/female terminal can be easily examined, and also the efficiency of the examination operation is enhanced. And besides, the compact and low-cost design of the terminal examination jig is achieved. Furthermore, by exchanging the limit gauge, many kinds of terminals can be examined, and there can be provided the terminal examination jig of a high general-purpose ability.

In the present invention, the base surface of the terminal is held against the fixing surface of the terminal holding portion by the fixing member, so that the reference position of the terminal relative to the opening portion of the limit gauge is determined.

In the present invention, the guide surface for the limit gauge is formed at the gauge receiving portion, and therefore the reference position of the limit gauge relative to the electrical contact portion of the terminal is determined. Therefore, the positioning of the opening portion of the limit gauge relative to the electrical contact portion of the terminal is effected, so that the bending of the terminal can be accurately examined.

In the present invention, by pivotally moving the limit gauge through an arbitrary angle, it can be easily judged whether or not the electrical contact portion of the terminal can pass through the opening portion of the limit gauge. Therefore, the efficiency of the examination operation is enhanced.

In the present invention, thanks to the provision of the support pin, the limit gauge can be pivotally moved in a stable manner. Therefore, the advantageous effect of the invention is further enhanced.

In the present invention, the width of the opening portion is substantially equal to the allowable amount of bending of the terminal. Therefore, when the bending of the terminal is within the allowable range, the electrical contact portion of the terminal passes through the opening portion of the limit gauge, and therefore it is judged that the terminal is an accepted product. Therefore, any terminal whose bending is beyond the allowable limit will not be delivered to a subsequent process step, and the quality of the wire harness is enhanced.

What is claimed is:

1. A terminal examination jig comprising:

a jig body including a gauge receiving portion and a terminal holding portion; and a limit gauge received in said gauge receiving portion, said limit gauge having an opening portion corresponding in shape to an electrical contact portion of said terminal;

wherein the limit gauge moves in a direction orthogonal to a terminal deformation and to the axial direction of the electrical contact portion being inspected.

2. A terminal examination jig as claimed in claim 1, wherein whether or not the bending of said terminal is within a predetermined tolerance is judged by checking whether or not said electrical contact portion of said terminal, projecting toward said limit gauge, can pass through said opening portion without interference.

3. A terminal examination jig according to claim 1, wherein said terminal holding portion has a fixing surface against which a base surface of said terminal is adapted to abut and a fixing member for pressing said terminal against said fixing surface to fix the terminal.

4. A terminal examination jig according to claim 1, wherein said gauge receiving portion has a guide surface for an outer surface of said limit gauge.

5. A terminal examination jig according to claim 1, wherein said limit gauge is pivotally supported on said jig body.

6. A terminal examination jig according to claim 1, wherein said gauge receiving portion has a support pin, and said limit gauge is pivotally supported by said support pin.

7. A terminal examination jig according to claim 1, wherein a width of said opening portion is substantially equal to an allowable amount of bending of said terminal.

8. A terminal examination jig comprising:

a jig body including a gauge receiving portion and a terminal holding portion; and a limit gauge received in said gauge receiving portion, said limit gauge having an opening portion corresponding in shape to an electrical contact portion of said terminal;

wherein the limit gauge is rotatable with respect to the electric contact portion.

* * * * *